(12) United States Patent
Hong

(10) Patent No.: US 8,879,723 B2
(45) Date of Patent: Nov. 4, 2014

(54) BATTERY CHARGING CASE WITH CHANGEABLE PANEL FOR AN ELECTRONIC DEVICE

(71) Applicant: Uncommon LLC, Chicago, IL (US)

(72) Inventor: John Hong, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 0 days.

(21) Appl. No.: 14/026,746

(22) Filed: Sep. 13, 2013

(65) Prior Publication Data

US 2014/0078671 A1    Mar. 20, 2014

Related U.S. Application Data

(63) Continuation-in-part of application No. 13/660,147, filed on Oct. 25, 2012, now Pat. No. 8,781,109, which is a continuation-in-part of application No. 29/431,945, filed on Sep. 12, 2012, and a continuation-in-part of application No. 29/417,069, filed on Mar. 29, 2012.

(51) Int. Cl.
| | |
|---|---|
| *H04M 1/00* | (2006.01) |
| *H04M 1/04* | (2006.01) |
| *H04B 1/38* | (2006.01) |
| *G06F 1/16* | (2006.01) |
| *H04M 1/02* | (2006.01) |

(52) U.S. Cl.
CPC .............. *G06F 1/1635* (2013.01); *H04M 1/04* (2013.01); *H04M 1/0283* (2013.01); *H04B 1/3888* (2013.01)
USPC .......................................... 379/451; 379/441

(58) Field of Classification Search
USPC ................ 379/441, 446, 449, 451, 454, 455, 379/428.04; 455/575.1, 575.8, 572, 573; 361/679.01, 679.3, 679.41, 679.56, 361/679.57; 206/305, 321, 701; D14/203.1, D14/203.3–203.7, 250–253
See application file for complete search history.

(56) References Cited

U.S. PATENT DOCUMENTS

| | | | | |
|---|---|---|---|---|
| D644,218 S | * | 8/2011 | Akana et al. | D14/341 |
| D647,519 S | * | 10/2011 | Rothbaum et al. | D14/250 |
| D649,539 S | * | 11/2011 | Hong | D14/250 |
| D671,105 S | * | 11/2012 | Rothbaum et al. | D14/250 |
| 2012/0018325 A1 | * | 1/2012 | Kim | 206/320 |
| 2012/0103844 A1 | * | 5/2012 | Piedra et al. | 206/320 |

* cited by examiner

*Primary Examiner* — Tuan D Nguyen
(74) *Attorney, Agent, or Firm* — Bishop Diehl & Lee, Ltd.

(57) ABSTRACT

A charging case or system for an electronic device case, having a protective housing capable of aesthetic alteration, includes a replaceable and customizable shell and a rechargeable battery unit. A plurality of shells may have different images thereon and can be interchanged in a continuous sidewall portion to alter the look of the case. The shell images may include various colors, pictures, designs, logos, or even text.

17 Claims, 18 Drawing Sheets

BATTERY CHARGING CASE WITH CHANGEABLE PANEL FOR AN ELECTRONIC DEVICE

RELATED APPLICATIONS

This application is a continuation-in-part of U.S. application Ser. No. 13/660,147, titled "Electronic Device Case With Changeable Panel" filed on Oct. 25, 2012, which is a continuation-in-part of U.S. patent Design application Ser. No. 29/431,945, filed on Sep. 12, 2012, which is a continuation-in-part of U.S. patent Design application Ser. No. 29/417,069, filed on Mar. 29, 2012. Each of the priority documents is hereby incorporated by reference.

TECHNICAL FIELD OF THE INVENTION

The present invention relates to charging and protection devices and/or systems for electronic devices such as, for example, a smart phone, a gaming device, a tablet or the like. Specifically, the invention relates to customizable devices for providing extra charging power and protection for an electronic device.

BACKGROUND OF THE INVENTION

Mobile phone cases have very quickly blossomed into a multi-billion dollar industry. With each new entry into the field, phone cases become lighter, stronger, more colorful, and even more securable. Many phone case designers and manufacturers have focused on the primary purpose of a phone case—i.e., to protect the phone within—sacrificing aesthetics in some instances. In fact, the protective phone case has become such a necessary component of the phone itself, case manufacturers are often given new phone details well-ahead of the general public so that such cases are available as soon as a new phone reaches store shelves.

However, other than some minor aesthetic differences, phone case providers have been unable to point to any meaningful improvements or advantages they provide over cases made by other manufacturers. As a result, purchases of phone cases are typically made based on aesthetic appeal alone. Further, because the aesthetic quality is such an important factor, it is not uncommon for some users to have more than one phone case for much the same reason that they might have more than one pair of shoes.

But purchasing two, three or even more protective cases for any portable electronic device is cost prohibitive for many. Also, even where cost may not be an issue, the bulkiness of having several unused device cases can be a problem. As fads and fashion change, or as people change, the desire for another different protective case may be created. The solution to these problems has been missed by prior case designers and manufacturers.

Further, while battery life is improving on many electronic devices, use of such devices is also seemingly on the rise. Despite even the best efforts to keep a device's battery charged, many users run into the problem of a low battery. In some devices (e.g., Apple's iPhone line), carrying spare batteries is not an option, as the battery is sealed within the device. This fact raises the need for vigilance in maintaining a charged battery. However, providing security in this area has never been a focus of protective cases.

Until the invention of the present application, many case manufacturers have stayed with adding new designs and new features by creating an entirely new case. The present invention solves these and other problems which went either unnoticed, ignored or unsolved by those skilled in the art. The present invention provides a case design which is capable of being changed repeatedly by a user without sacrificing portability, functionality or affordability.

SUMMARY OF THE INVENTION

There is disclosed herein an improved protective case, that is, a customizable protective case system for an electronic device which avoids the disadvantages of prior devices while affording additional aesthetic and operating advantages, such as extra battery power.

Generally speaking, the protective case for an electronic device comprises a battery unit comprising a rechargeable battery electronically coupled to male and female charging ports, and a customizable case for concealing the battery unit and for protecting an enclosed electronic device. The case is preferably comprised of a primary shell, which attaches to the panel of the battery unit and a continuous sidewall for surrounding the periphery of the electronic device and the shell. A plurality of openings may be defined in the sidewall for permitting access to ports or control buttons on the electronic device. The sidewall also includes a front edge and a back edge which provide the ability to secure the shell and the electronic device.

In an embodiment, the removable primary shell is configured to fit within an open area defined by the continuous sidewall and a retaining groove is formed in the periphery of the back edge of the continuous sidewall to engage a ridge or flange formed about the periphery of the shell.

In a system embodiment of the invention, a plurality of the shells may be used to periodically alter the aesthetic look of the protective case by changing shells based on an image on each. The image on each shell may be different colors, photos, designs, logos, and even text, such as a favorite poem or quote.

Further, it is an aspect of the various embodiments that connection of an electronic device to the charging case will result in charging of the battery within the electronic device from the battery within the battery unit of the case. Use of the female charging port with a compatible electric cord results in charging of the rechargeable battery attached to the case.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
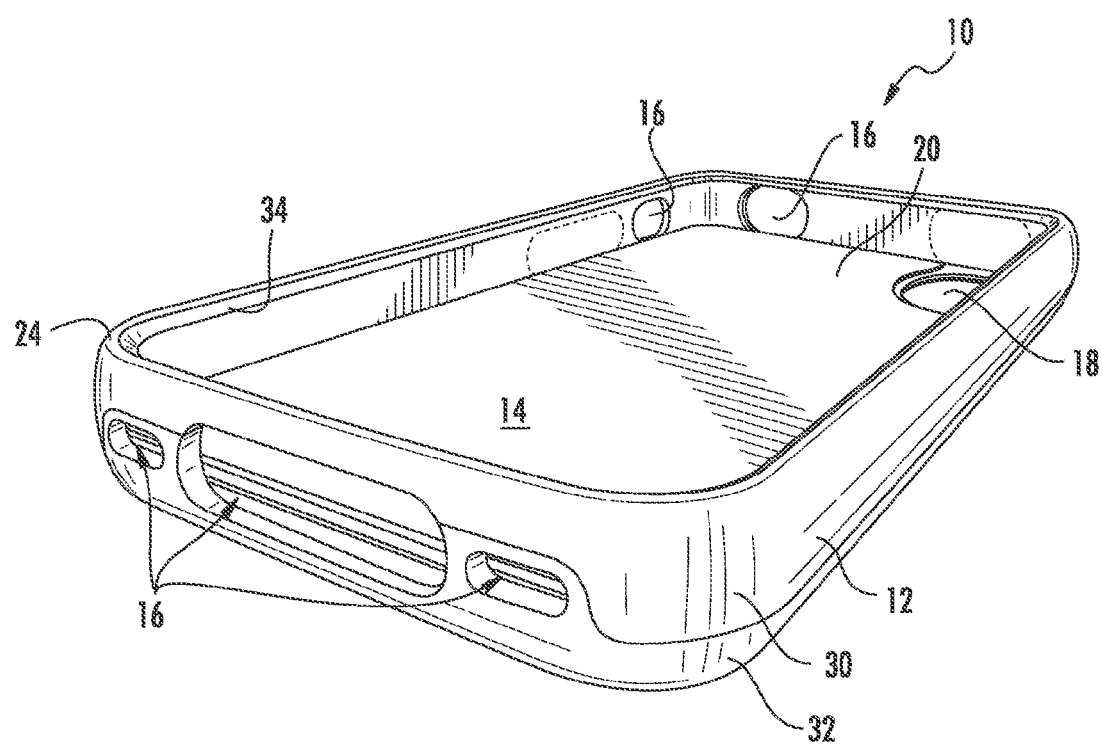
FIG. 1 is a perspective view of an embodiment of a case made in accordance with the present invention.
Figure 2:
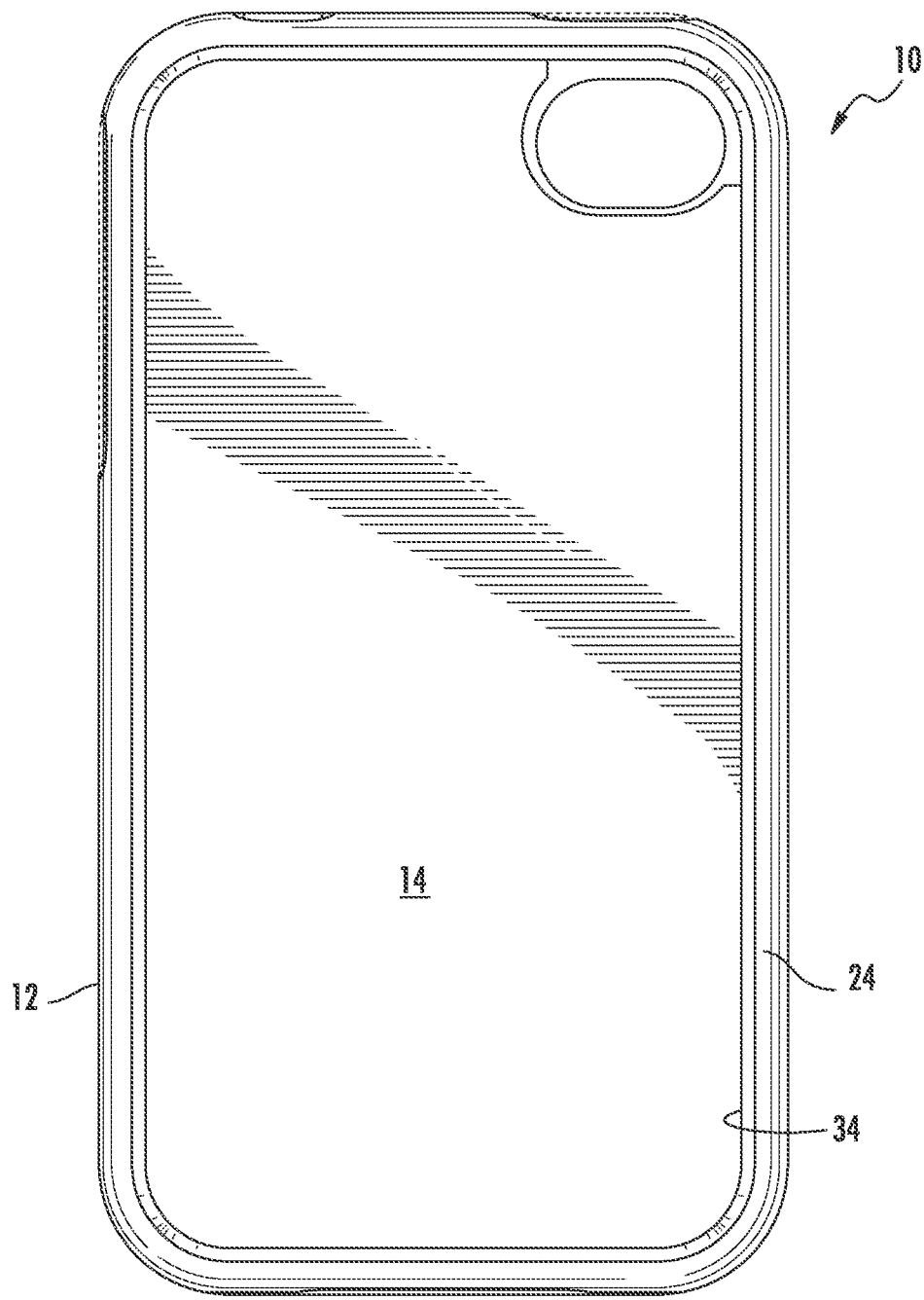
FIG. 2 is a front (inside) view of the embodiment of FIG. 1.
Figure 3:
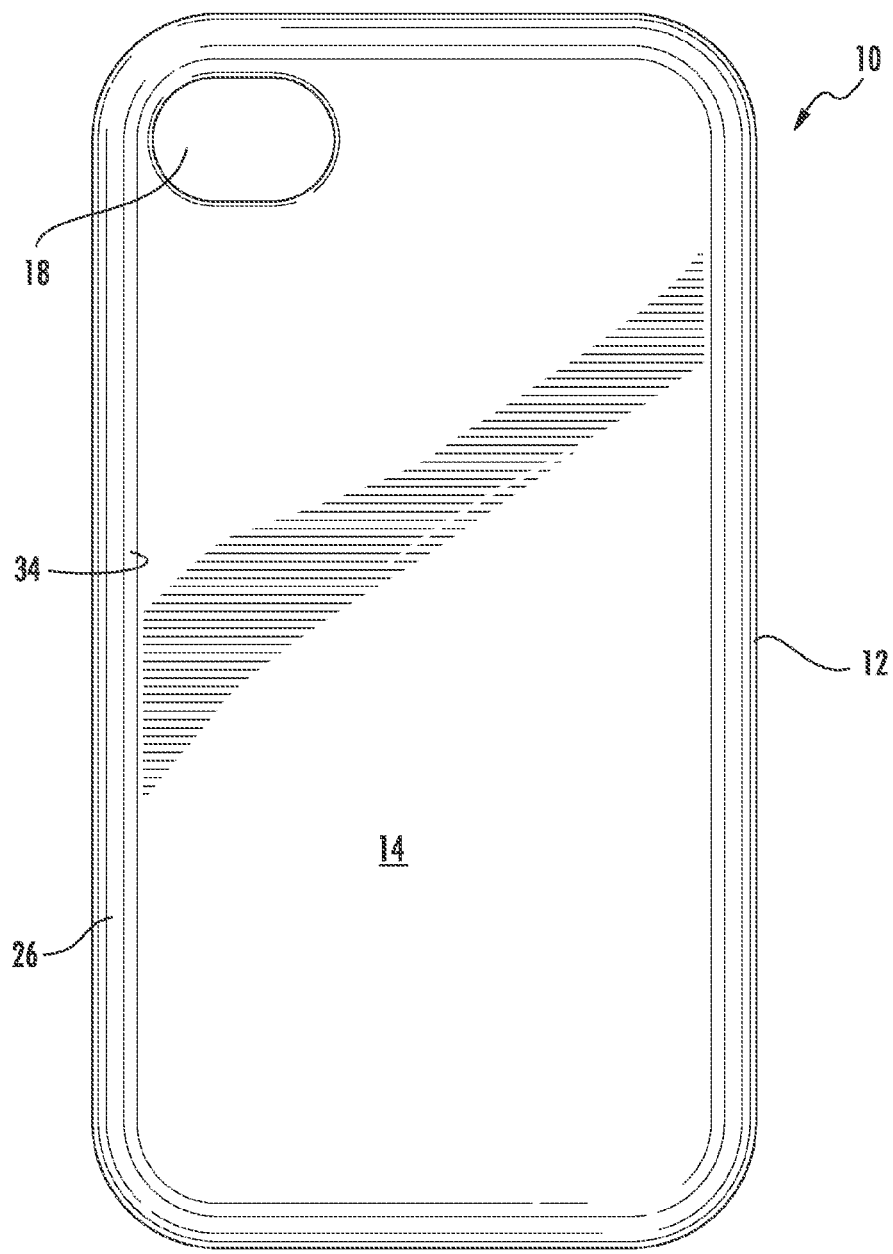
FIG. 3 is a back view of the embodiment of FIG. 1.
Figure 4:
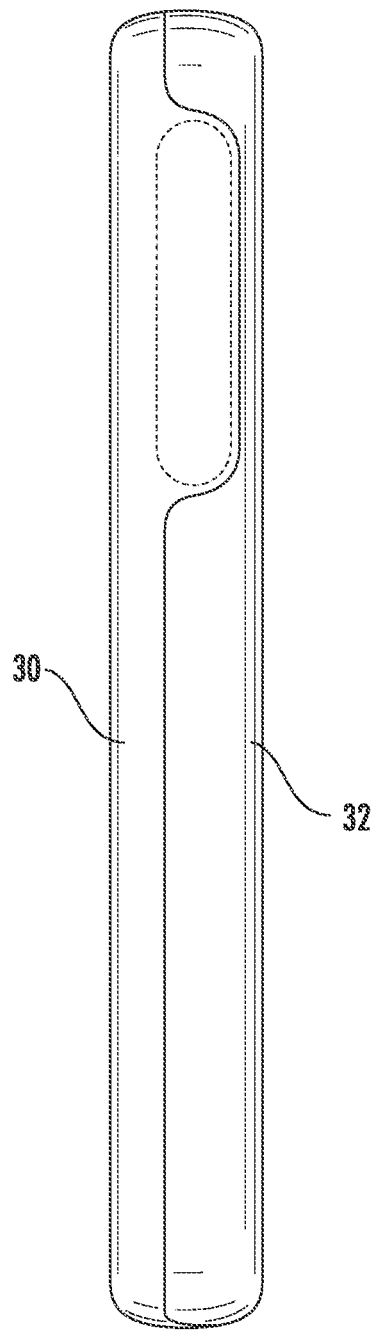
FIG. 4 is a side view of the embodiment of FIG. 1.
Figure 5:
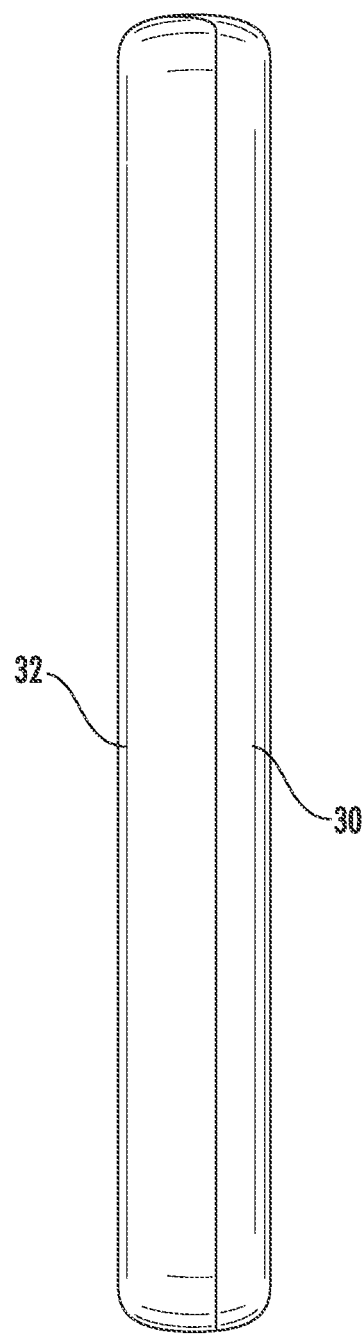
FIG. 5 is another side view of the embodiment of FIG. 1.
Figure 6:
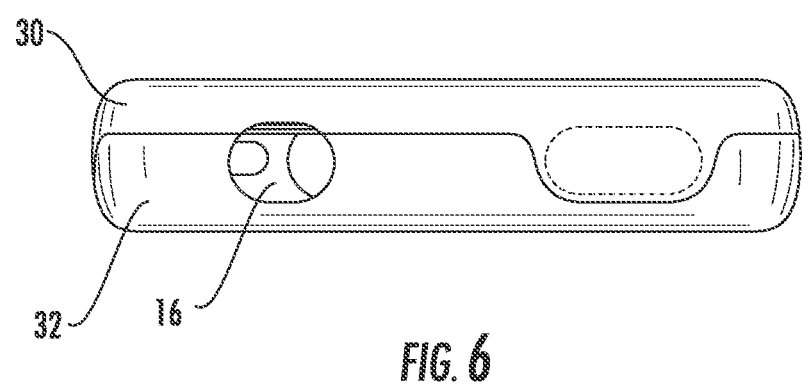
FIG. 6 is a top view of the embodiment of FIG. 1.
Figure 7:
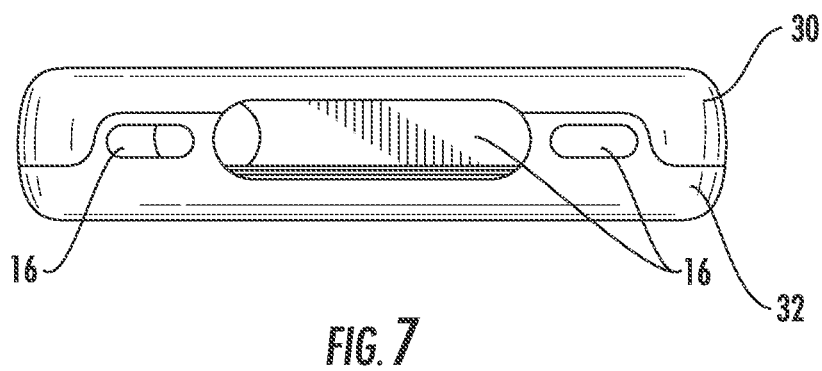
FIG. 7 is a bottom view of the embodiment of FIG. 1.
Figure 8:
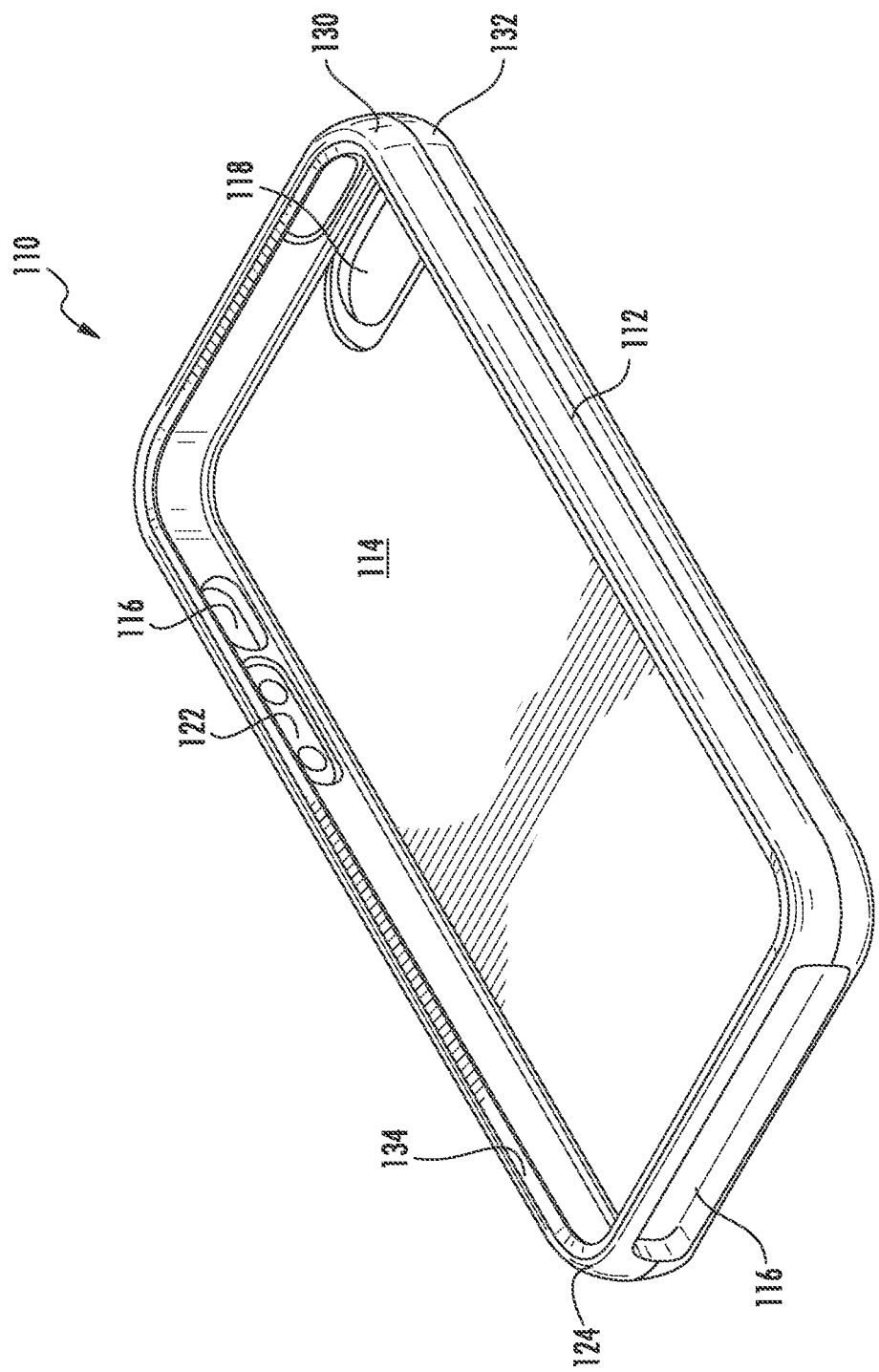
FIG. 8 is a perspective view of another embodiment of a case made in accordance with the present invention.
Figure 9:
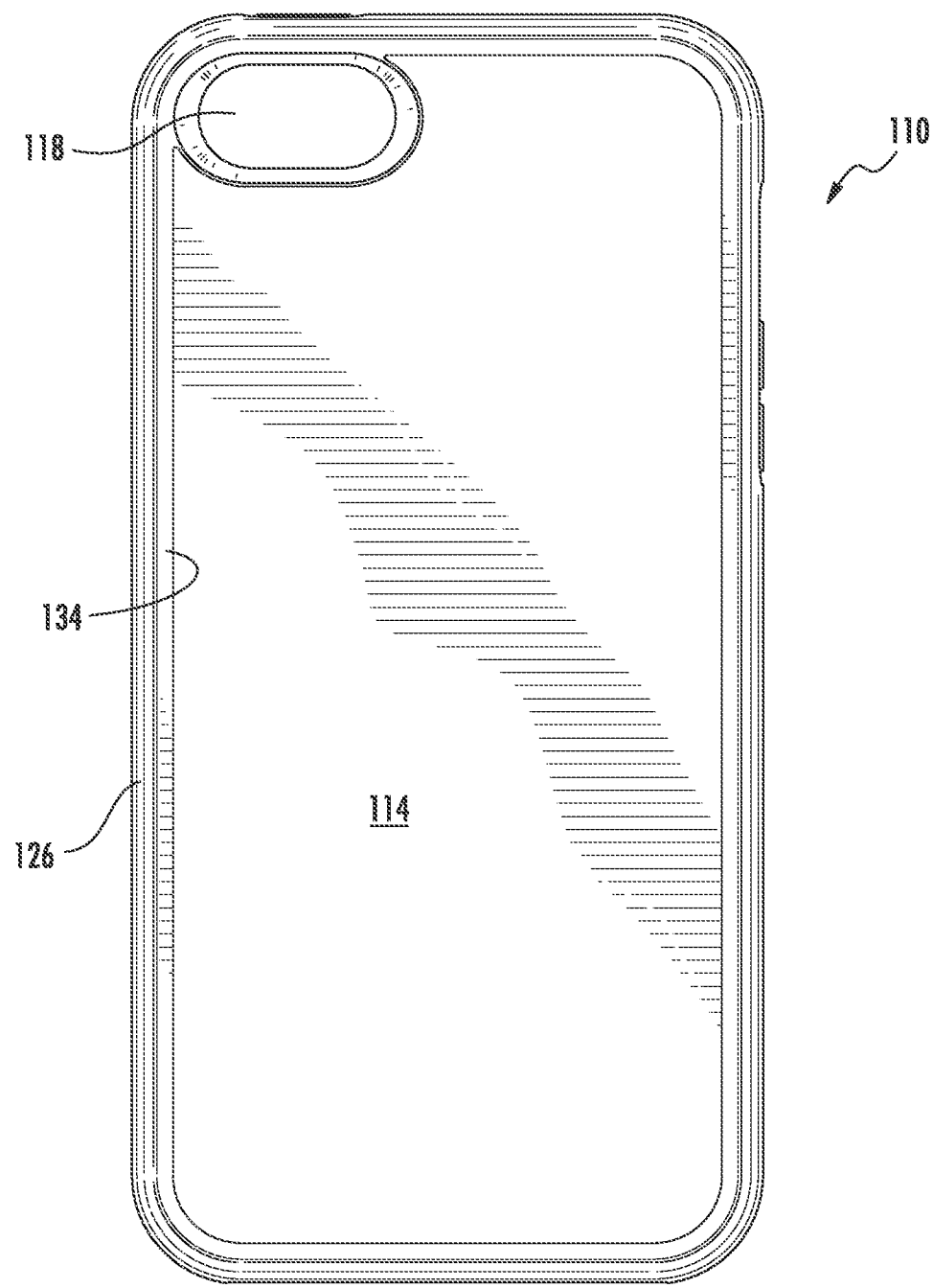
FIG. 9 is a back view of the embodiment of FIG. 8.
Figure 10:
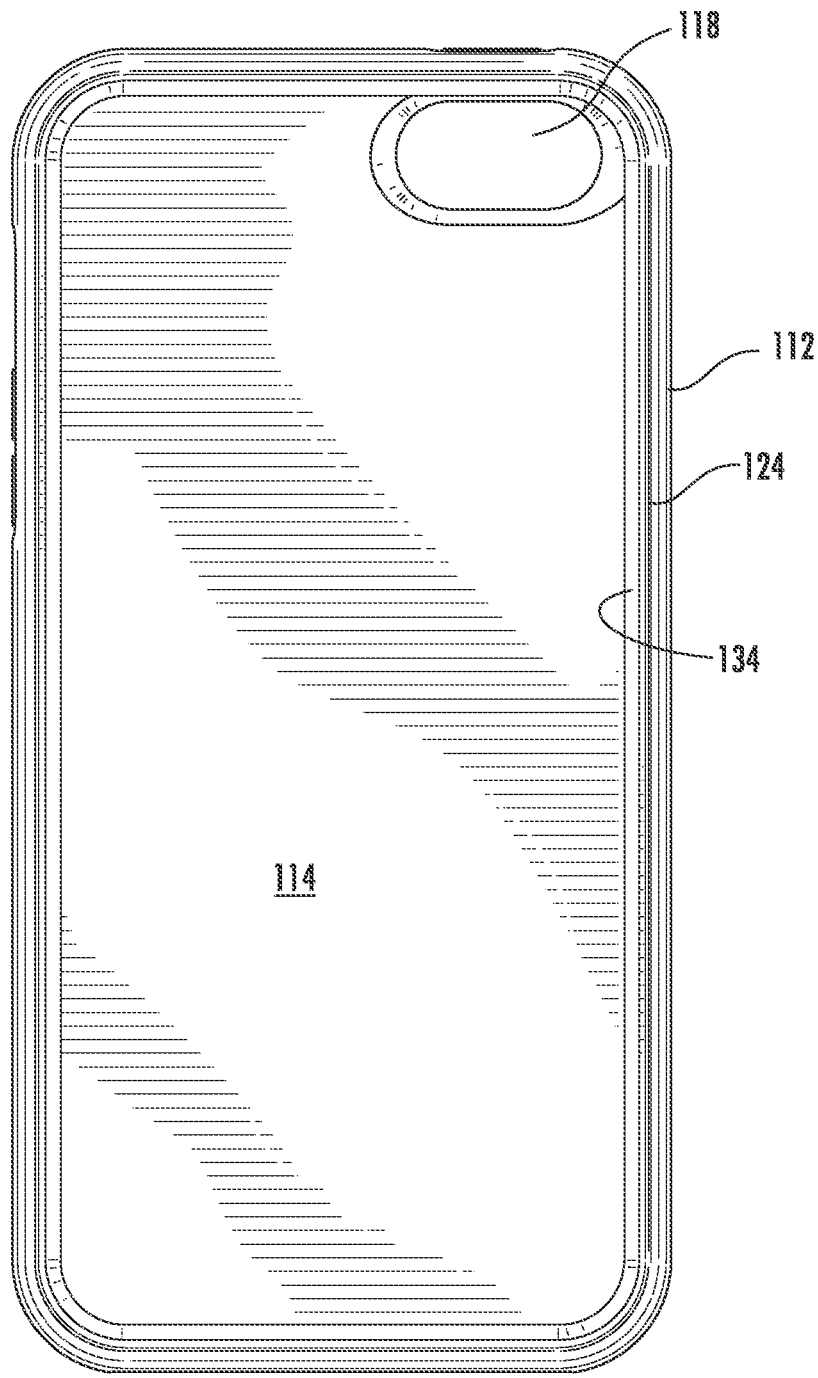
FIG. 10 is a front (inside) view of the embodiment of FIG. 8.
Figure 11:
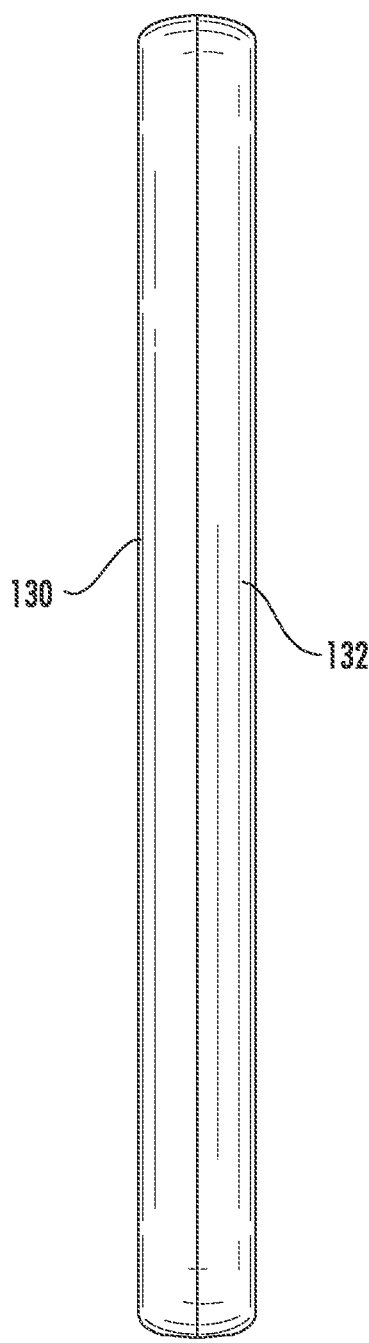
FIGS. 11 and 12 are side views of the embodiment of FIG. 8.
Figure 12:
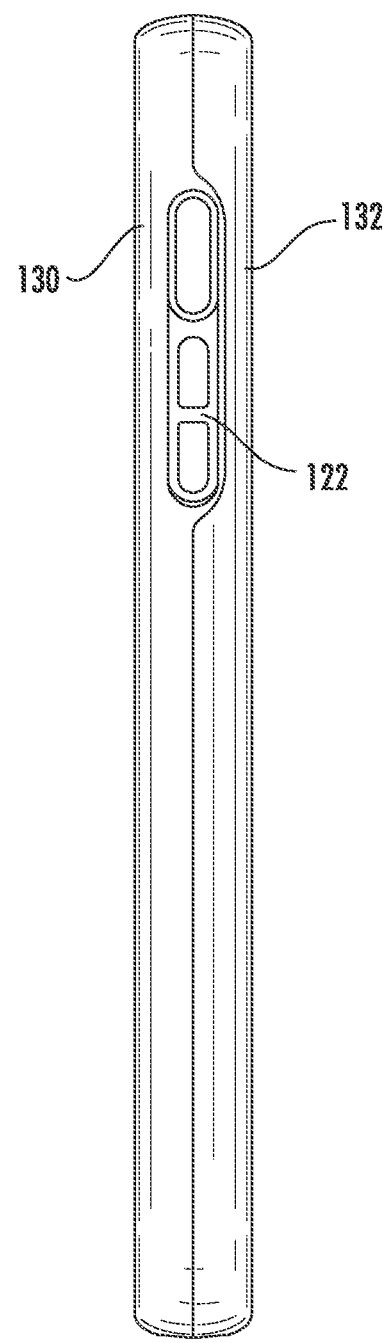
Figure 13:
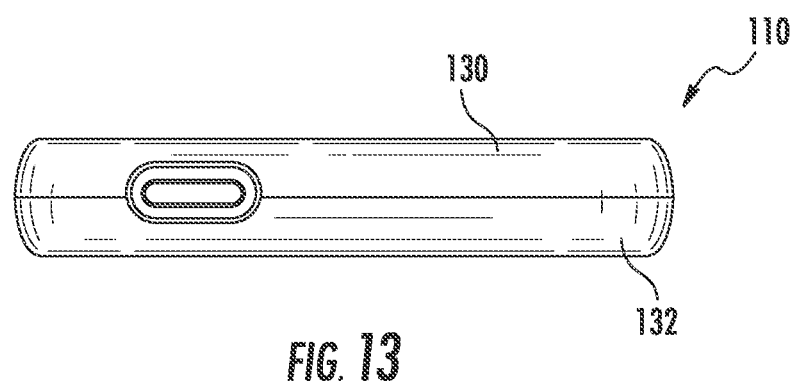
FIG. 13 is a top view of the embodiment of FIG. 8.
Figure 14:
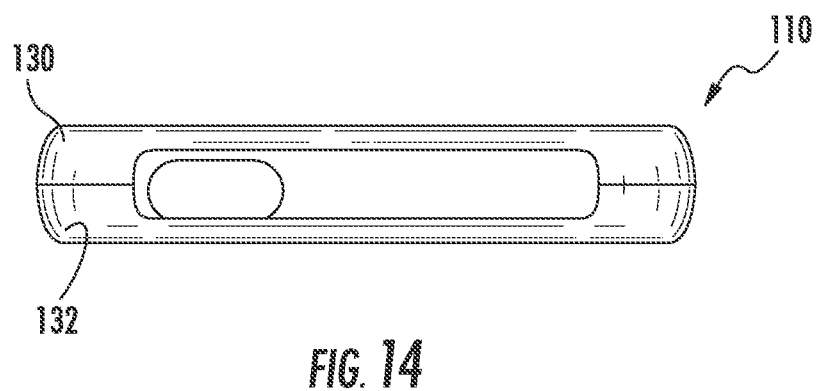
FIG. 14 is a bottom view of the embodiment of FIG. 8.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-15, there are illustrated embodiments of a protective case, generally designated by the numerals 10 and 110. The particular illustrated cases 10 (FIGS. 1-7 and 15) and 110 (FIGS. 8-14) are for an Apple® iPhone 4/4S and an iPhone 5, respectively. In fact, while all the embodiments illustrated are directed to iPhones, it should be understood that the principles of the invention can be more broadly applied to most any smart phone, as well as other types of portable electronic devices such as gaming consoles (e.g., Gameboy), tablets (e.g., iPad) and the like, as long as a protective case is useful.

As can be seen in FIGS. 1-7, the case 10 is comprised of a continuous outer sidewall 12 and a back panel 14. The sidewall 12 is designed to fit about the periphery of an electronic device (not shown) in a protective manner and holding in place the back panel 14, which also protects the secured device. Numerous openings 16 may be defined within the sidewall 12 to align with any ports, speakers, microphones, switches or buttons on the device used to operate or interact with the electronic device. Alternatively, integral button areas 122 (See FIG. 8) may be provided in the sidewall 12 which interact with a corresponding component on the device (e.g., a volume toggle button). The sidewall 12 defines an open area 20 into which the electronic device will be positioned.

The sidewall 12 has both a front edge 24 and a back edge 26. In an alternate embodiment, the sidewall 12 is comprised of two parts. These may be a front and back portion or a top and bottom portion. The two parts would preferably snap or friction fit together to form the entirety of the sidewall 12.

A front portion 30 including the front edge 24 and a back portion 32 including the back edge 26 would allow the electronic device to be sandwiched between the two portions when assembled. A retaining flange 34 preferably extends from each of the front and back edges, 24 and 26, to provide securing both the device and the back panel 14 within the open area 20 of the sidewall 12.

FIGS. 8-14 illustrate a case 110 very similar to the case 10 of FIGS. 1-7. The case 110 is comprised of a continuous outer sidewall 112 and a back panel 114. The sidewall 112 is designed to fit about the periphery of an electronic device (not shown) in a protective manner and holding in place the back panel 114, which also protects the secured device. Numerous openings 116 may be defined within the sidewall 112 to align with any ports, speakers, microphones, switches or buttons on the device used to operate or interact with the electronic device. An integral button area 122 is provided in the sidewall 112 which interact with a corresponding component on the device (e.g., a volume toggle button). The sidewall 112 defines an open area 120 into which the electronic device will be positioned.

The sidewall 112 has both a front edge 124 and a back edge 126. In an alternate embodiment, the sidewall 112 is comprised of two parts. These may be a front and back portion or a top and bottom portion. The two parts would preferably snap or friction fit together to form the entirety of the sidewall 112.

Figure 15:
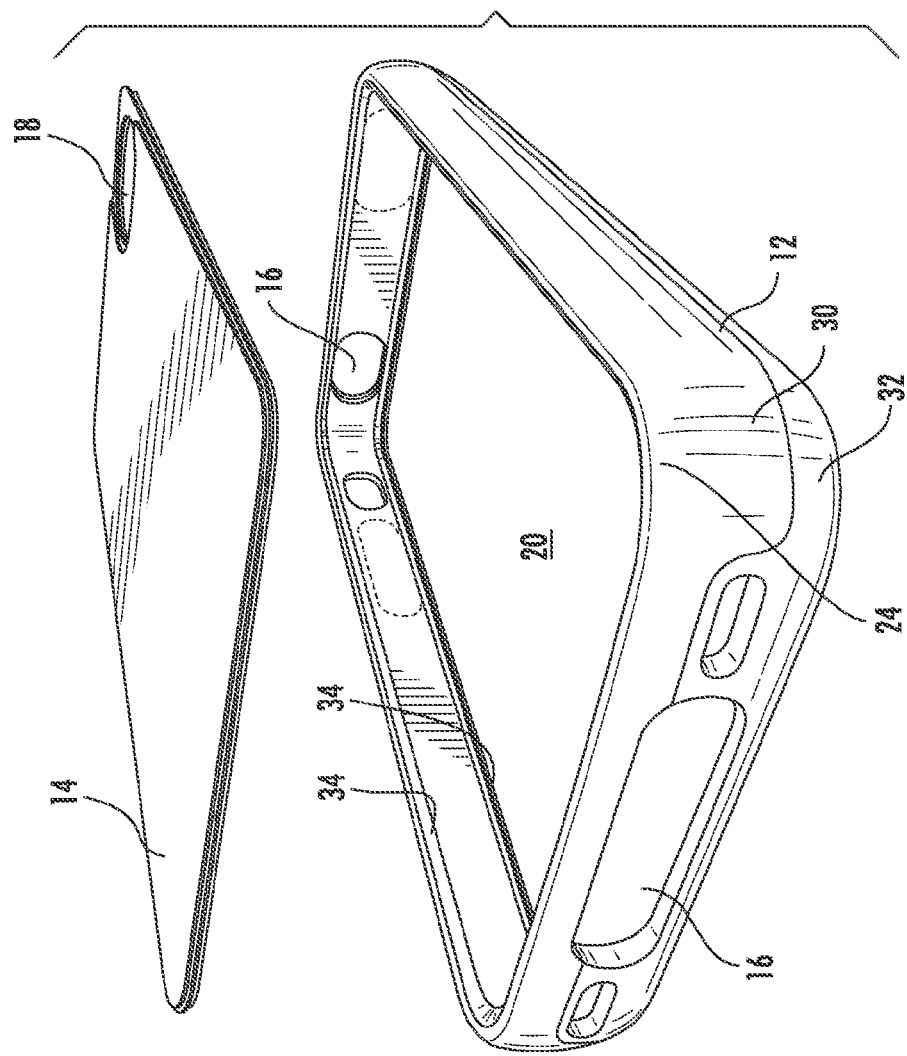
FIG. 15 is an exploded view of the embodiment of FIG. 1.
Figure 16:
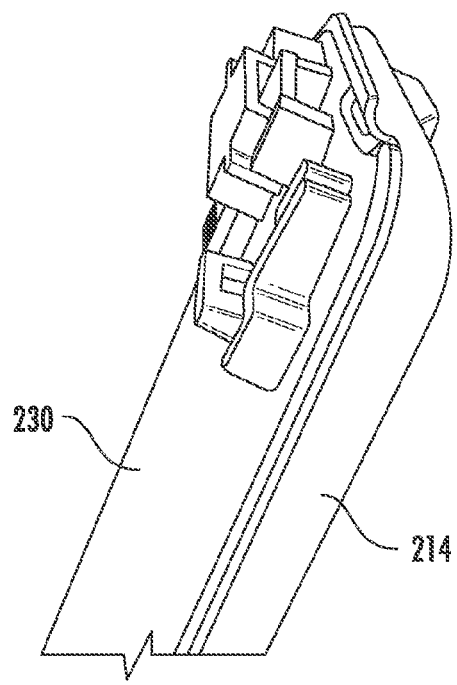
FIG. 16 is a perspective view of a portion of an embodiment of the charging case described in the present disclosure.
Figure 17:
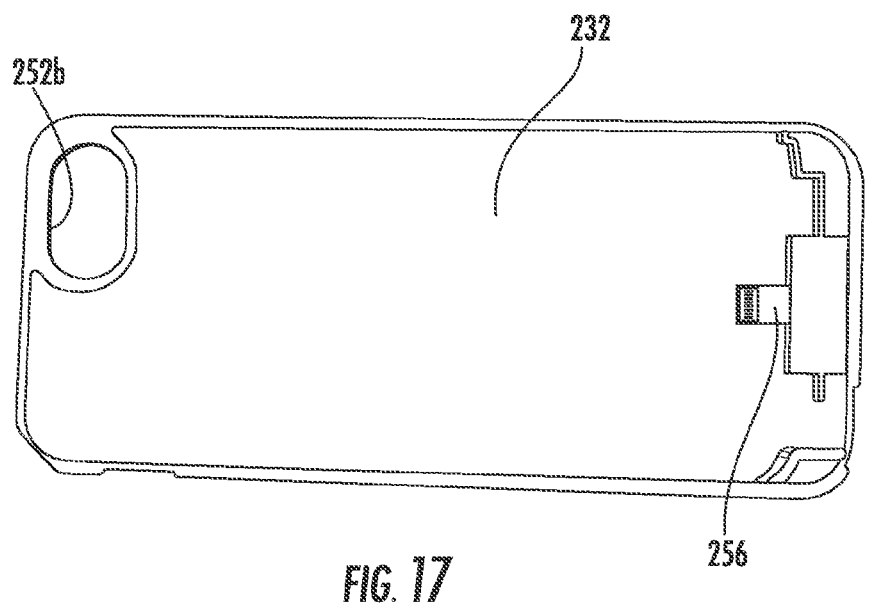
FIG. 17 is a front view of an embodiment of the charging case described in the present disclosure.
Figure 18:
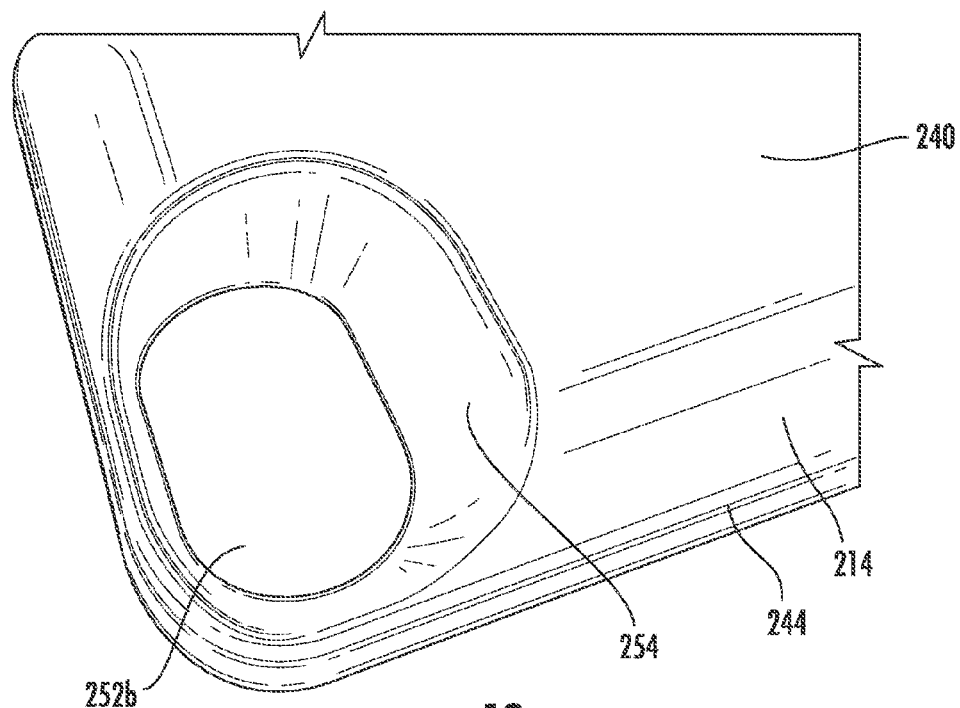
FIG. 18 is a back view of an embodiment of the shell of the disclosed charging case showing the camera lens and flash opening.
Figure 19:
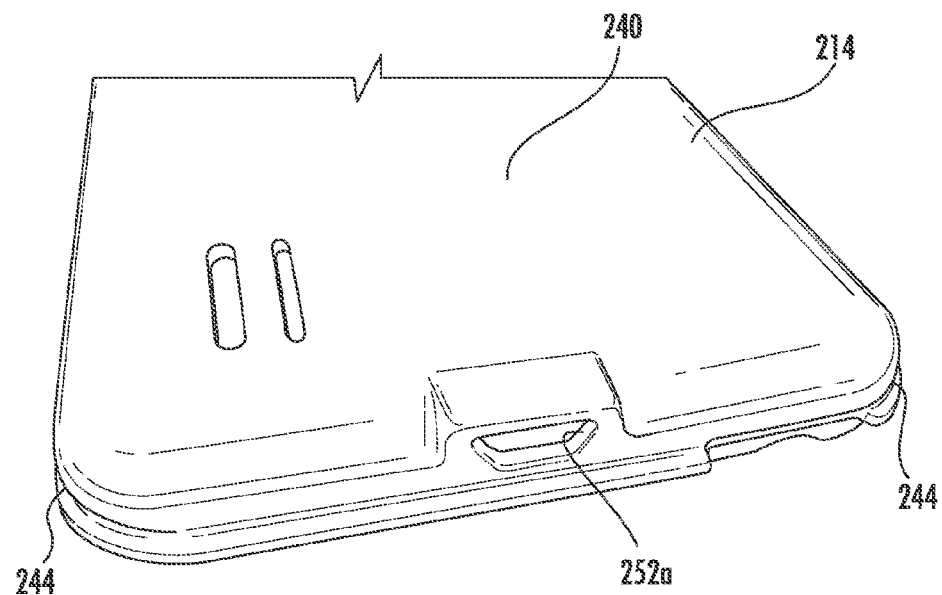
FIG. 19 is a back view of a charging port opening defined in the shell of FIG. 18.
Figure 20:
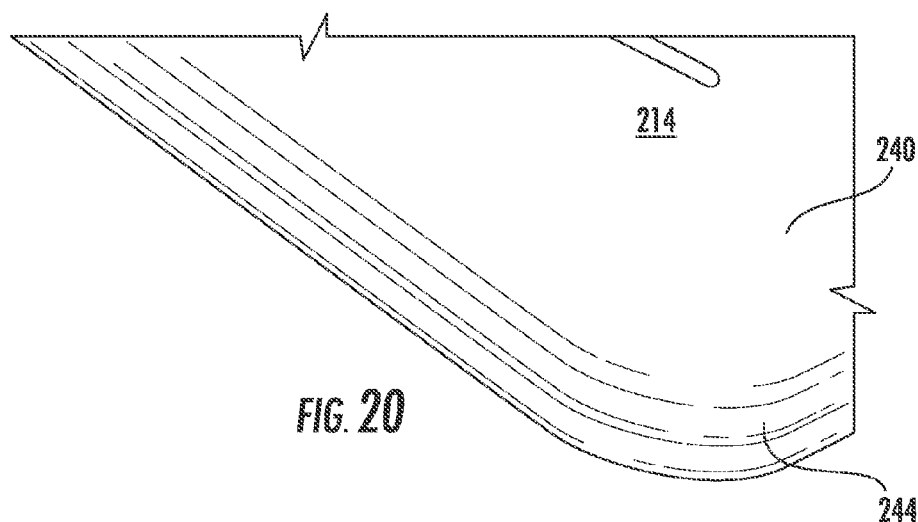
FIG. 20 is a partial close-up view of the shell of FIG. 18 showing the peripheral groove.
Figure 21:
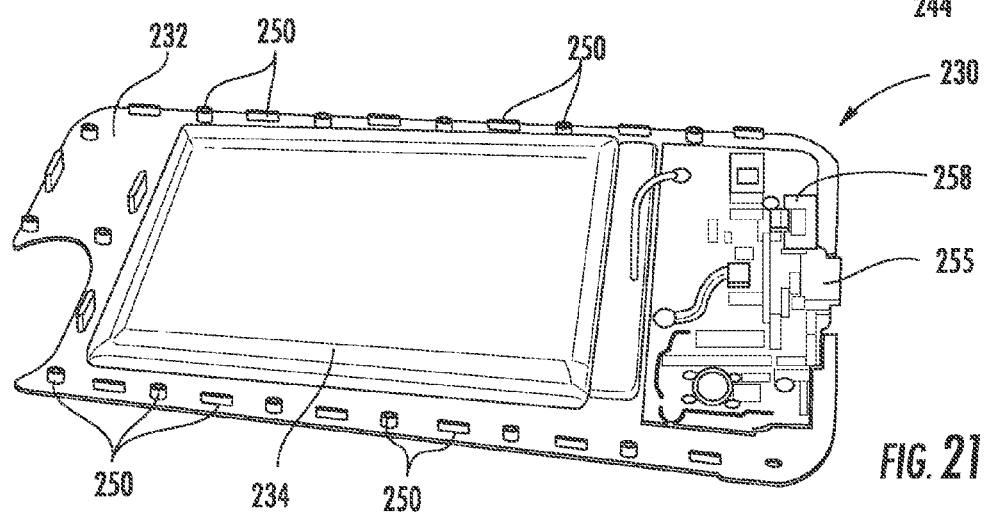
FIG. 21 is a perspective view of an embodiment of the disclosed battery unit.
Figure 22:
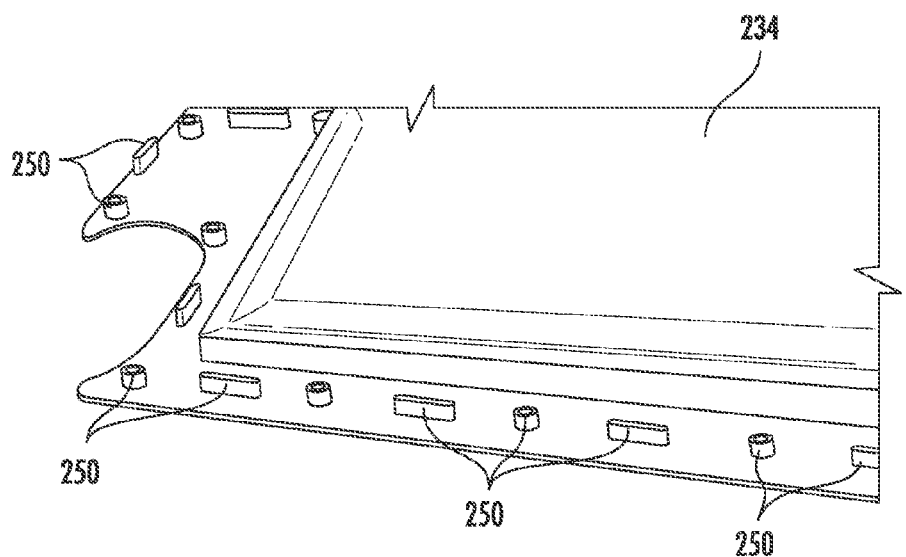
FIG. 22 is a partial view of the battery unit of FIG. 21 showing snap connectors used to connect to the shell.
Figure 23:
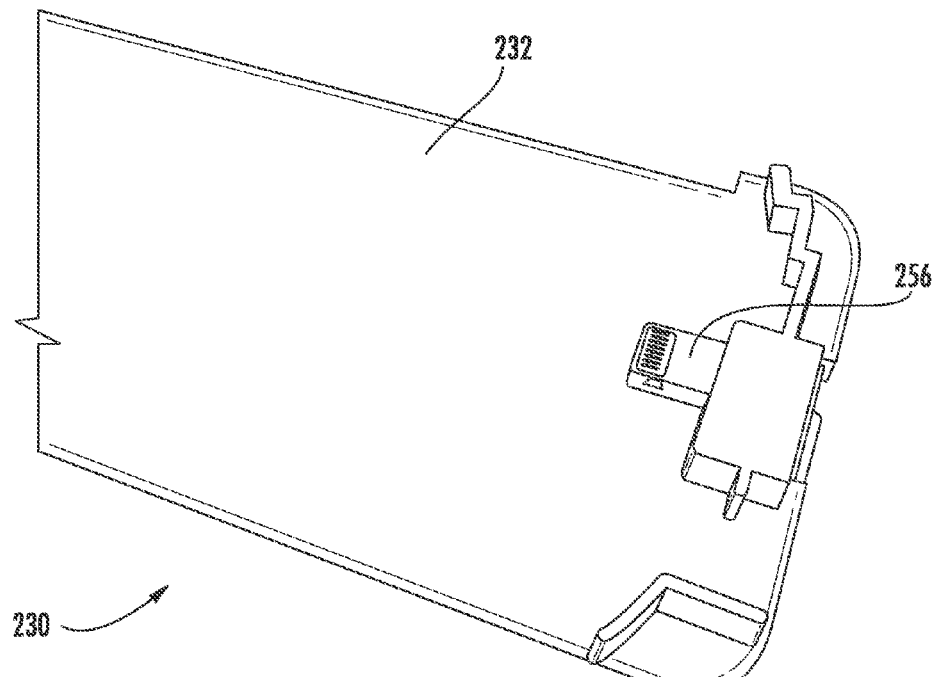
FIG. 23 is a view of the battery unit of FIG. 21 showing a male charging plug.
Figure 24:
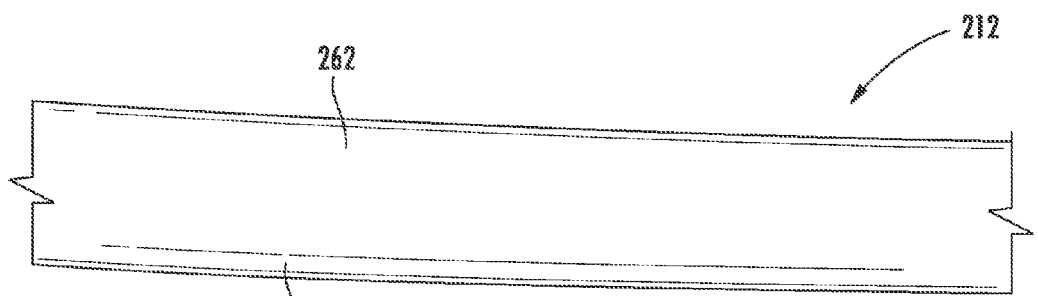
FIGS. 24 and 25 are partial close-up views of an embodiment of the disclosed continuous sidewall showing a peripheral retaining ridge and retaining flange.
Figure 25:
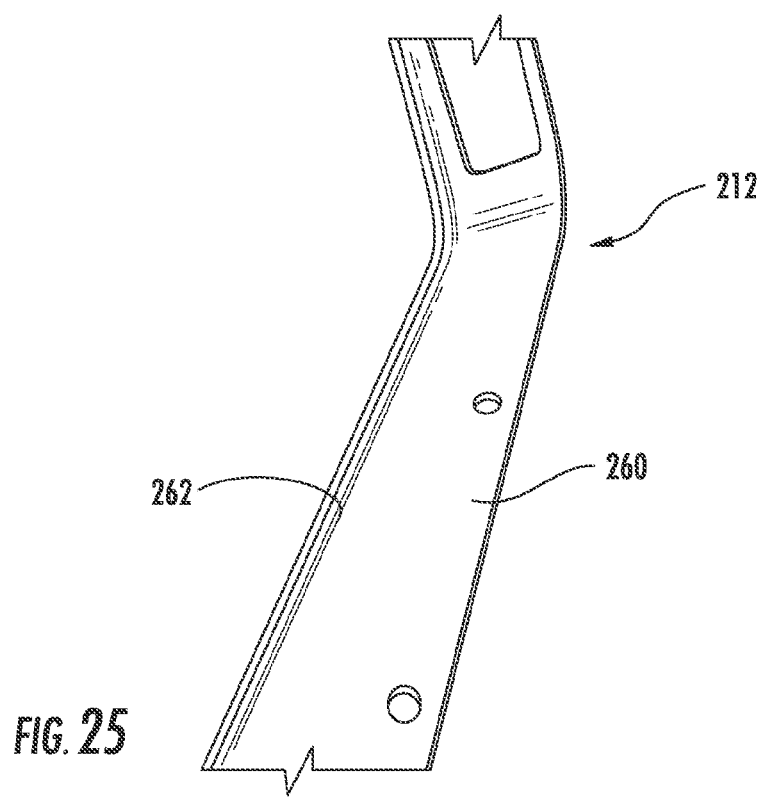
Figure 26:
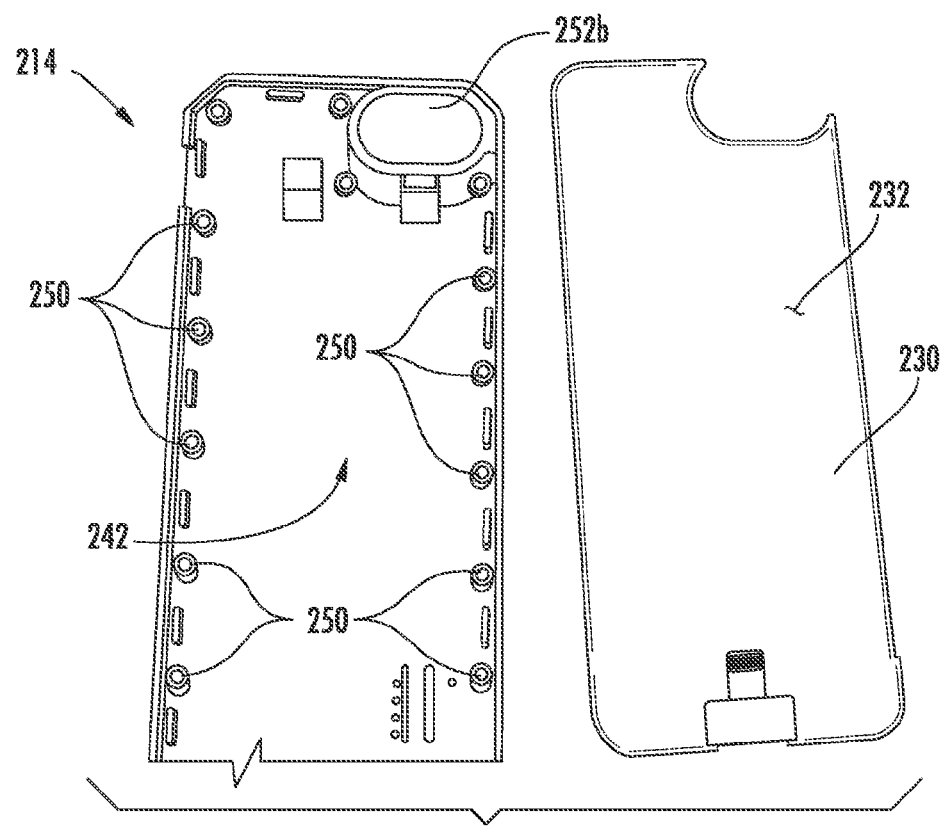
FIG. 26 is a front view showing an embodiment of the shell interior side-by-side with an embodiment of the panel of the battery unit.

The back panel 14 (or 114) is basically a flat, rectangular shaped panel which may include various degrees of cushioning and/or rigid material (preferably layered) to protect an enclosed device. Openings 118, such as for a phone camera, may be provided within the back panel 14/114. Further, each panel 14/114 may include an aesthetic image, such as color(s), picture, design, logo, or even text. The image may be customizable for the particular user, if desired. To change the look of the case 10/110, the user need only remove the electronic device, change-out the existing panel with a newer panel and replace the device. FIG. 15 illustrates the removed panel 14.

Referring now to FIGS. 16-26, an embodiment of a charging case is illustrated. The charging case 210 has all the interchangeability, customization and replaceability features of the above disclosed embodiments. Some of these features and benefits may not be repeated in the following description of case 210, but are nonetheless applicable.

As can be seen, the case 210 is comprised of a shell 214, a battery unit 230 and a continuous sidewall 212. The battery unit 230 snaps into the shell 214 and the shell and battery unit assembly is then snapped into the continuous sidewall 212 to form the desired protective/charging case 210.

The shell 214 is preferably formed of a thermoform plastic, particularly a strong impact resistant plastic, but may be made from numerous other materials, if desired. The shell 210 has an outer back surface 240, an inner front surface 242, and a peripheral edge including a groove 244. The outermost edge of the shell 214 may extend outward to further facilitate engagement with the continuous sidewall 212, as will be explained below. The inner front surface 242 includes a plurality of snap-fit components 250 for detachable attachment to the battery unit 230. The shell 214 may also include openings 252, for example, a charging port opening 252a and a camera lens/flash opening 252b, to facilitate operation of an encased electronic device. The camera lens/flash opening 252b is defined in the shell 214 by an oval sidewall 254 which slopes outwardly, especially along the thicker bottom area of the opening 252b, so as not inhibit the camera lens or create a "bounce-back" reflection from the camera flash.

The battery unit 230 is comprised of a support panel 232 having corresponding snap-fit components on an inner surface to facilitate connection to the shell 214. On the inner surface of the support panel 232 is also attached a rechargeable battery 234. The battery 234 is electrically coupled to both an input charging port 255 and an output charging plug 256. An intermediate PC board 258, know in the art, manages inputting and outputting power from the rechargeable battery 234.

The continuous sidewall 212 is substantially as described above. It may be comprised of one or two sections and is configured to attach about the periphery of the shell 214, including any electronic device seated thereon. A retaining ridge 260 is formed about the periphery of a front edge of the sidewall 212 to secure an electronic device. Likewise, a flange 262 is formed about the periphery of the back edge of the sidewall 212 to engage the groove 244 of the shell 212. Openings in the sidewall 216 may be provided to correspond with buttons (e.g., volume, power, etc.) on a specific electronic device.

In use, an electronic device (not shown) is first positioned to engage the male charging plug 256 of the battery unit 230. The shell 214 may then be snapped onto the battery unit 230 to conceal the battery 234. Then, the continuous sidewall 212 is mounted about the periphery of the electronic device and shell 214, being sure to properly engage the flange 262 and groove 244 and making sure the retaining flange 260 is abutted to the electronic device and all buttons and corresponding opening align. With the two piece continuous sidewall, the rear portion of the sidewall would be attached from the shell side of the assembly, while the front portion of the sidewall would be attached from the electronic device side of the assembly. The two portions would then snap-fit (or otherwise connect) to secure the device and shell in place.

As the shell 214 is capable of being customized by adding colors, pictures, etc., the entire look of the case 210 may be altered by merely changing the shell 214. Accordingly, the disclosed charging case 210 may be packaged as a system including a plurality of differently colored/decorated shells. A user may simple store unused shells until needed. This provides a significant cost savings to consumers who wish to have multiple phone cases, as the shell 214 is relatively inexpensive to mold compared to other components of the case 210.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A case for charging an electronic device, the case comprising:
   a battery unit comprised of a panel, a rechargeable battery attached to the panel, a charging port electrically coupled to the rechargeable battery, and a charging plug electrically coupled to the rechargeable battery and positioned to connect to an electronic device;
   a primary shell configured to detachably fasten to the panel and conceal the rechargeable battery, the shell having a retaining groove formed about a periphery; and
   a removable continuous sidewall which surrounds the periphery of the shell and includes a ridge for engaging the retaining groove, the continuous sidewall also having a plurality of openings defined therein for permitting access to ports or control buttons on an electronic device positioned within the case.

2. The case of claim 1, wherein the continuous sidewall comprises two parts, including an upper portion having a front edge and a lower portion having a back edge, and wherein the upper and lower portions connect together around the battery unit and the primary shell.

3. The case of claim 2, further comprising a camera opening having a perimeter defined within the shell by a sidewall.

4. The case of claim 3, wherein the sidewall is outwardly sloping along at least a portion of the perimeter.

5. The case of claim 1, wherein the primary shell is replaceable with an alternate shell having a different aesthetic image thereon.

6. The case of claim 1, wherein the continuous sidewall is replaceable with an alternate sidewall.

7. The case of claim 1, wherein the primary shell and the panel comprise a plurality of corresponding snap fittings for detachable connection.

8. The case of claim 1, wherein the primary shell snap fits into the continuous sidewall.

9. The case of claim 1, further comprising a retaining flange extending from the front edge of the continuous sidewall.

10. A battery charging system for an electronic device, the system comprising:
    a battery unit comprised of a panel, a rechargeable battery attached to the panel, a charging port electrically coupled to the rechargeable battery, and a charging plug electrically coupled to the rechargeable battery and positioned to connect to an electronic device; and
    a case for housing the battery unit and the electronic device, the case comprising:
      a plurality of interchangeable shells, each shell having an image or color thereon and separately configured to detachably connect to the panel of the battery unit, and each interchangeable shell comprising a groove about a periphery of the shell;
      a continuous sidewall for surrounding a periphery of the battery unit and an attached interchangeable shell, the sidewall having a flange formed along the periphery of a back edge for engaging the groove of one of the plurality of interchangeable shells, a retaining flange formed along a periphery of a front edge for securing an electronic device, and a plurality of openings defined within the sidewall for permitting access to ports or control buttons on the electronic device;
    wherein one of the plurality of interchangeable shells is attached to the battery unit panel during use, while remaining interchangeable shells are stored for later use.

11. The battery charging system of claim 10, wherein the continuous sidewall comprises two parts including an upper portion having a front edge and a lower portion having a back edge, and wherein the upper and lower portions connect together around the battery unit and one of the plurality of shells.

12. The battery charging system of claim 11, further comprising a camera opening having a perimeter defined within each of the plurality of interchangeable shells by an integral sidewall.

13. The battery charging system of claim 12, wherein the integral sidewall is outwardly sloping along at least a portion of the perimeter.

14. The case of claim 10, wherein the each of the plurality of interchangeable shells and the panel comprise a plurality of corresponding snap fittings for detachable connection of a shell to the panel.

15. The case of claim 10, wherein each of the plurality of shells separately snap fit into engagement with the continuous sidewall.

16. The case of claim 10, further comprising a retaining flange extending from the front edge of the continuous sidewall for securing an electronic device.

17. A case for securing and charging an electronic device, the case comprising:
- a battery unit comprised of a panel, a rechargeable battery attached to the panel, a charging port electrically coupled to the rechargeable battery, and a charging plug electrically coupled to the rechargeable battery and positioned to connect to an electronic device;
- a primary shell configured to detachably fasten to the panel and conceal the rechargeable battery, the shell having a retaining groove formed about a periphery, and a camera opening having a perimeter defined within the primary shell by an integral sidewall, the sidewall outwardly sloping along at least a portion of the perimeter; and
- a removable continuous sidewall configured to surround the periphery of the shell and comprising an upper portion having a front edge and a lower portion having a back edge, and wherein the upper and lower portions connect together around the battery unit and the primary shell, the continuous sidewall further including a ridge for engaging the retaining groove of the primary shell, and also having a plurality of openings defined therein for permitting access to ports or control buttons on an electronic device positioned within the case.

* * * * *